United States Patent
Gong

(10) Patent No.: US 8,787,763 B2
(45) Date of Patent: Jul. 22, 2014

(54) REPEATER

(71) Applicant: Huawei Technologies Co., Ltd, Shenzhen (CN)

(72) Inventor: Lanping Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/870,093

(22) Filed: Apr. 25, 2013

(65) Prior Publication Data

US 2013/0236182 A1 Sep. 12, 2013

Related U.S. Application Data

(63) Continuation of application No. PCT/CN2012/083147, filed on Oct. 18, 2012.

(30) Foreign Application Priority Data

Oct. 18, 2011 (CN) ...................... 2011 2 0396606 U

(51) Int. Cl.
*H04J 14/02* (2006.01)
*H04J 14/08* (2006.01)
*H04B 10/20* (2006.01)

(52) U.S. Cl.
USPC ................. 398/97; 398/98; 398/64; 398/173

(58) Field of Classification Search
CPC ....... H04B 7/1555; H04B 10/00; H04J 14/08; H04J 14/02; H04J 14/0226; H04L 7/0075
USPC ......... 398/96–98, 115, 64, 173; 455/25, 63.4, 455/63.1, 67.16; 370/315
See application file for complete search history.

(56) References Cited

U.S. PATENT DOCUMENTS

| | | | | |
|---|---|---|---|---|
| 6,163,395 A | * | 12/2000 | Nemecek et al. | 398/198 |
| 6,785,558 B1 | * | 8/2004 | Stratford et al. | 455/561 |
| 6,895,185 B1 | * | 5/2005 | Chung et al. | 398/72 |
| 6,983,127 B1 | * | 1/2006 | Da Torre et al. | 455/67.11 |

(Continued)

FOREIGN PATENT DOCUMENTS

| CN | 201298847 Y | 8/2009 |
|---|---|---|
| CN | 202231722 U | 5/2012 |

OTHER PUBLICATIONS

International Search Report received in Application No. PCT/CN2012/083147, mailed Jan. 17, 2013, 11 pages.

*Primary Examiner* — Ken Vanderpuye
*Assistant Examiner* — Abbas H Alagheband
(74) *Attorney, Agent, or Firm* — Slater & Matsil, L.L.P.

(57) ABSTRACT

Embodiments of the present invention provide a repeater, including a local unit and a remote unit. The local unit includes a base station interface unit, multiple local basic units and a controller. The remote unit includes multiple remote basic units. The controller is configured to generate, according to a down-tilt angle and/or azimuth angle of a downlink signal instructed by a control instruction, a downlink signal phase for each remote basic unit. The multiple local basic units each are configured to perform, according to the downlink signal phase generated by the controller for a corresponding remote basic unit, phase adjustment on the downlink signal sent by the base station interface unit. The multiple remote basic units each are configured to receive the downlink signal sent by a corresponding local basic unit and to send the downlink signal.

11 Claims, 7 Drawing Sheets

(56) References Cited

U.S. PATENT DOCUMENTS

| | | |
|---|---|---|
| 7,848,654 B2 * | 12/2010 | Sauer et al. ................... 398/115 |
| 8,639,121 B2 * | 1/2014 | George et al. ................. 398/115 |
| 2002/0003645 A1 * | 1/2002 | Kim et al. ..................... 359/145 |
| 2002/0155818 A1 * | 10/2002 | Boros et al. .................. 455/67.4 |
| 2003/0036359 A1 * | 2/2003 | Dent et al. ...................... 455/63 |
| 2003/0050016 A1 * | 3/2003 | Boros et al. .................. 455/67.4 |
| 2004/0057543 A1 * | 3/2004 | Huijgen et al. ............... 375/356 |
| 2005/0085267 A1 * | 4/2005 | Lemson et al. ............ 455/562.1 |
| 2005/0201323 A1 * | 9/2005 | Mani et al. ................... 370/328 |
| 2006/0121944 A1 * | 6/2006 | Buscaglia et al. ............. 455/561 |
| 2006/0205343 A1 * | 9/2006 | Runyon et al. ................ 455/11.1 |
| 2006/0244675 A1 * | 11/2006 | Elliot et al. .................... 343/853 |
| 2007/0258432 A1 * | 11/2007 | Lee et al. ...................... 370/347 |
| 2007/0280159 A1 * | 12/2007 | Liu et al. ....................... 370/330 |
| 2008/0056167 A1 * | 3/2008 | Kim et al. ..................... 370/294 |
| 2008/0081671 A1 * | 4/2008 | Wang et al. ................ 455/562.1 |
| 2008/0145056 A1 * | 6/2008 | Boldi et al. ..................... 398/96 |
| 2008/0240719 A1 * | 10/2008 | Kim et al. ....................... 398/96 |
| 2010/0093282 A1 * | 4/2010 | Martikkala et al. .......... 455/63.4 |
| 2010/0226304 A1 * | 9/2010 | Shoji ............................. 370/315 |
| 2014/0050483 A1 * | 2/2014 | Berlin et al. .................. 398/115 |

* cited by examiner

REPEATER

CROSS-REFERENCE TO RELATED APPLICATIONS

This application is a continuation of International Application No. PCT/CN2012/083147, filed on Oct. 18, 2012, which claims priority to Chinese Patent Application No. 201120396606.3, filed on Oct. 18, 2011, both of which are hereby incorporated by reference in their entireties.

TECHNICAL FIELD

Embodiments of the present invention relate to the field of communications technologies, and in particular, to a repeater.

BACKGROUND

In a conventional repeater, a retransmit antenna is separated from a repeater remote unit, and proper positions need to be selected for installing the retransmit antenna and the repeater remote unit. Normally, during installation, a down-tilt angle and an azimuth angle of the retransmit antenna need to be adjusted. When the azimuth angle is being adjusted, a positioning tool needs to be used for accurate positioning, for which the efficiency is low. After installation, maintenance and network optimization of the conventional repeater are also complicated. An operator needs to be contacted for entering a station for a second time and mounting the tower again to adjust the azimuth angle by using the positioning tool. In this way, the capital expenditure (abbreviated as CAPEX) is high.

Additionally, in the prior art, the down-tilt angle and the azimuth angle of the retransmit antenna are adjusted mechanically, and therefore, the efficiency and precision are low.

SUMMARY OF THE INVENTION

Embodiments of the present invention provide a repeater, to improve efficiency and precision for adjusting a down-tilt angle and/or an azimuth angle.

Embodiments of the invention provide a repeater, including a local unit and a remote unit.

The local unit includes a base station interface unit, multiple local basic units connected to the base station interface unit, and a controller connected to the multiple local basic units.

The remote unit includes multiple remote basic units, where the multiple remote basic units are arranged as an array, and the multiple remote basic units are in one-to-one correspondence with the multiple local basic units.

The base station interface unit is configured to receive a downlink signal sent by a base station, and send the downlink signal to the multiple local basic units.

The controller is configured to generate a downlink signal phase for each remote basic unit according to a down-tilt angle and/or azimuth angle of the downlink signal instructed by a control instruction.

The multiple basic local units each are configured to perform phase adjustment on an uplink signal according to an uplink signal phase generated by the controller for a corresponding remote basic unit, or to perform phase adjustment on the downlink signal sent by the base station interface unit according to the downlink signal phase of a corresponding remote basic unit, and then send the downlink signal after the phase adjustment to the corresponding remote basic unit.

The multiple remote basic units each are configured to receive a downlink signal sent by a corresponding local basic unit and send the downlink signal.

The multiple remote basic units each are further configured to receive an uplink signal and send the uplink signal to a corresponding local basic unit.

The controller is configured to generate an uplink signal phase for each remote basic unit according to a down-tilt angle and/or azimuth angle of the uplink signal instructed by a control instruction.

The multiple local basic units each are further configured to perform, according to the uplink signal phase generated by the controller for the corresponding remote basic unit, phase adjustment on the uplink signal sent by the corresponding remote basic unit, and send the uplink signal after the phase adjustment to the base station interface unit.

The base station interface unit is further configured to send the uplink signals, which are sent by the multiple local basic units, to the base station.

Further, each of the multiple local basic units includes a baseband processing module, a downlink parameter setting module, a frequency conversion module, and a first media conversion module cascaded in sequence.

The baseband processing module is connected to the base station interface unit and is configured to perform baseband processing on the downlink signal sent by the base station interface unit.

The downlink parameter setting module is connected to the controller and is configured to, according to the downlink signal phase generated by the controller for the remote basic unit corresponding to the local basic unit to which the downlink parameter setting module belongs; perform phase adjustment on the downlink signal after the baseband processing.

The frequency conversion module is configured to convert the downlink signal after the phase adjustment into a radio frequency form.

The first media conversion module is configured to perform media conversion on the downlink signal in the radio frequency form, and send the signal after the media conversion to the remote basic unit corresponding to the local basic unit to which the first media conversion module belongs.

Further, each of the local basic units further includes an uplink parameter setting module that is connected to the baseband processing module and the frequency conversion module.

The first media conversion module is further configured to receive an uplink signal sent by the remote basic unit corresponding to the local basic unit to which the first media conversion module belongs, and perform media conversion on the uplink signal.

The frequency conversion module is further configured to convert the uplink signal after the media conversion into a baseband form.

The uplink parameter setting module is connected to the controller and is configured to, according to the uplink signal phase generated by the controller for the remote basic unit corresponding to the local basic unit to which the uplink parameter setting module belongs; perform phase adjustment on the uplink signal in the baseband form.

The baseband processing module is configured to perform baseband processing on the uplink signal after the phase adjustment, and send the uplink signal after the baseband processing to the base station interface unit.

Further, the repeater supports multiple carriers, where each of the multiple local basic units includes multiple baseband processing modules and multiple downlink parameter setting modules; the multiple baseband processing modules are in one-to-one correspondence with the multiple carriers and the multiple downlink parameter setting modules are in one-to-one correspondence with the multiple carriers; each of the multiple local basic units further includes a first multiple-carrier module and a second multiple-carrier module; the multiple baseband processing modules are connected to the base station interface unit through the first multiple-carrier module; and the multiple downlink parameter setting modules are connected to the frequency conversion module through the second multiple-carrier module.

The controller is specifically configured to generate a downlink signal phase of each carrier for each remote basic unit according to a down-tilt angle and/or azimuth angle of the downlink signal of each carrier instructed by a control instruction.

The first multiple-carrier module is configured to receive the downlink signal sent by the base station interface unit, and perform carrier separation on the downlink signal to obtain a downlink sub-signal of each carrier.

The multiple baseband processing modules each are configured to perform baseband processing on the downlink sub-signal of the corresponding carrier, and send the downlink sub-signal of the corresponding carrier after the baseband processing to a corresponding downlink parameter setting module.

The multiple downlink parameter setting modules each are configured to, according to a downlink signal phase of each carrier generated by the controller for the remote basic unit corresponding to the local basic unit to which the downlink parameter setting modules belong, perform phase adjustment on the downlink sub-signal of the corresponding carrier after the baseband processing.

The second multiple-carrier module is configured to combine downlink sub-signals of each carrier after the phase adjustment.

The frequency conversion module is specifically configured to convert the signal obtained by the combination into a radio frequency form.

The first media conversion module is specifically configured to perform media conversion on the signal in the radio frequency form, and send the signal after the media conversion to the remote basic unit corresponding to the local basic unit.

Further, each of the multiple local basic units further includes multiple uplink parameter setting modules, where the multiple uplink parameter setting modules are in one-to-one correspondence with the multiple carriers, and the multiple uplink parameter setting modules are connected to the frequency conversion module through the second multiple-carrier module.

The controller is further configured to generate an uplink signal phase of each carrier for each remote basic unit according to a down-tilt angle and/or azimuth angle of the uplink signal of each carrier instructed by a control instruction.

The first media conversion module is further configured to receive an uplink signal sent by the remote basic unit corresponding to the local basic unit to which the first media conversion module belongs, and perform media conversion.

The frequency conversion module is further configured to convert the uplink signal after the media conversion into a baseband form.

The second multiple-carrier module is further configured to perform carrier separation on the uplink signal in the baseband form to obtain an uplink sub-signal of each carrier.

The multiple uplink parameter setting modules each are configured to, according to an uplink signal phase of each carrier generated by the controller for the remote basic unit corresponding to the local basic unit to which the uplink parameter setting modules belong, perform phase adjustment on the uplink sub-signal of the corresponding carrier, and send the uplink sub-signal of the corresponding carrier after the phase adjustment to a corresponding baseband processing module.

The multiple baseband processing modules each are further configured to perform baseband processing on the uplink sub-signal of the corresponding carrier after the phase adjustment.

The first multiple-carrier module is configured to combine uplink sub-signals of each carrier after the baseband processing, and send the signal obtained by the combination to the base station interface unit.

Further, the local unit further includes a first downlink calibration unit connected to the multiple local basic units.

The remote unit further includes a second downlink calibration unit connected to the multiple remote basic units and the first downlink calibration unit.

The first downlink calibration unit is configured to generate a first calibration signal, and send the first calibration signal to the multiple remote basic units.

The multiple remote basic units each are further configured to process the first calibration signal.

The second downlink calibration unit is configured to send a first calibration signal processed by each remote basic unit to the first downlink calibration unit.

The first downlink calibration unit is further configured to generate, according to the generated first calibration signal and the first calibration signal that is processed by each remote basic unit and is returned by the second downlink calibration unit, a downlink calibration parameter for each remote basic unit.

The multiple local basic units each are specifically configured to perform, according to the downlink signal phase generated by the controller for the corresponding remote basic unit and the downlink calibration parameter generated by the first downlink calibration unit for the corresponding remote basic unit, phase adjustment on the downlink signal.

Further, the local unit further includes a first uplink calibration unit connected to the multiple local basic units.

The remote unit further includes a second uplink calibration unit connected to the multiple remote basic units and the first uplink calibration unit.

The first uplink calibration unit is configured to generate a second calibration signal, and send the second calibration signal to the second uplink calibration unit.

The second uplink calibration unit is configured to send the second calibration signal to the multiple remote basic units.

The multiple remote basic units each are further configured to process the second calibration signal, and send the processed second calibration signal to the first uplink calibration unit.

The first uplink calibration unit is further configured to generate, according to the generated second calibration signal and a processed second calibration signal returned by each remote basic unit, an uplink calibration parameter for each remote basic unit.

The multiple local basic units each are specifically configured to perform, according to the uplink signal phase generated by the controller for the corresponding remote basic unit and the uplink calibration parameter generated by the first uplink calibration unit for the corresponding remote basic unit, phase adjustment on the uplink signal.

Further, each of the multiple remote basic units includes a second media conversion module, an amplifier, a filter bank, a coupler, and an antenna cascaded in sequence, where the coupler is connected to the second downlink calibration unit and the second uplink calibration unit.

Further, the local unit further includes a remote unit interface unit, and the remote unit further includes a local unit interface unit, where the multiple local basic units and the multiple remote basic units are connected through the remote unit interface unit and the local unit interface unit.

Further, the repeater is an optical fiber repeater, the remote unit interface unit is a first wavelength-division multiplexing WDM unit, the local unit interface unit is a second WDM unit, and the first media conversion module and the second media conversion module are both photoelectric conversion modules.

With embodiments of the present invention, by using the technical means where multiple remote basic units arranged as an array are set in a remote unit; an uplink signal phase is generated in a local unit for each remote basic unit according to a down-tilt angle and/or azimuth angle of the uplink signal instructed by a control instruction, and phase adjustment are performed on the uplink signal in each of multiple local basic units that are corresponding to the multiple remote basic units according to the uplink signal phase of a corresponding remote basic unit; or a downlink signal phase is generated for each remote basic unit according to a down-tilt angle and/or azimuth angle of the downlink signal instructed by a control instruction, and phase adjustment is performed on the downlink signal in each of the multiple local basic units that are corresponding to the multiple remote basic units according to the downlink signal phase of a corresponding remote basic unit, the uplink signal phases or downlink signal phases corresponding to the multiple remote basic units can be adjusted, and an expected down-tilt angle and/or azimuth angle of the uplink signal or downlink signal can be obtained, thereby improving efficiency and precision for adjusting the down-tilt angle and/or azimuth angle.

BRIEF DESCRIPTION OF THE DRAWINGS

To describe the technical solutions in the embodiments of the present invention more clearly, the following briefly introduces the accompanying drawings for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION OF ILLUSTRATIVE EMBODIMENTS

To make the objectives, technical solutions, and advantages in the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons skilled in the art based on the embodiments of the present invention without creative efforts shall fall within the protection scope of the present invention.

Figure 1:
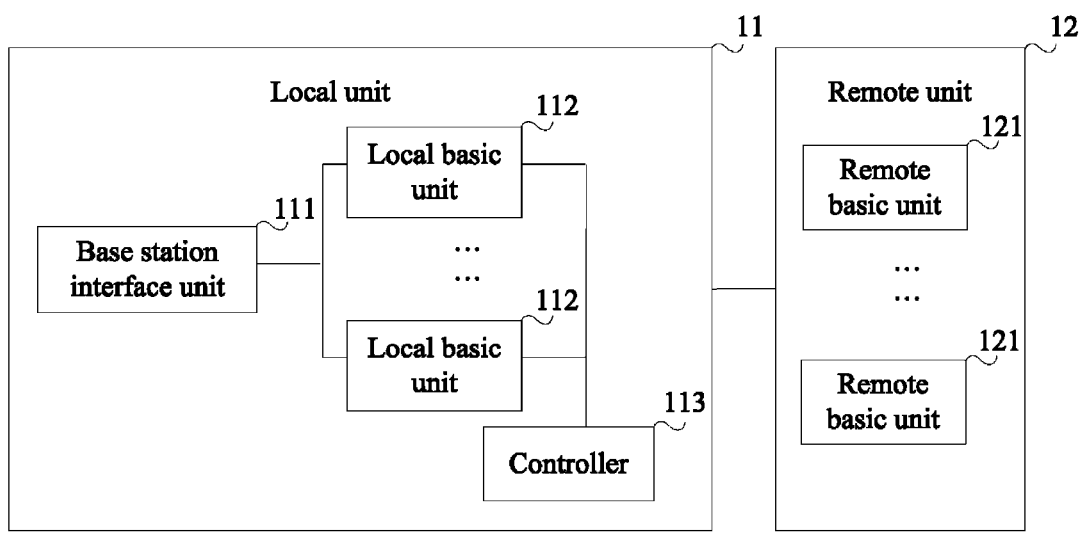
FIG. 1 is a schematic structural diagram of a repeater according to an embodiment of the present invention.

FIG. 1 is a schematic structural diagram of a repeater according to an embodiment of the present invention. As shown in FIG. 1, the repeater includes a local unit 11 and a remote unit 12.

The local unit 11 includes a base station interface unit 111, multiple local basic units 112 connected to the base station interface unit 111, and a controller 113 connected to the multiple local basic units 112.

The remote unit 12 includes multiple remote basic units 121, where the multiple remote basic units 121 are arranged as an array, and the multiple remote basic units 121 are in one-to-one correspondence with the multiple local basic units 112.

The base station interface unit 111 is configured to receive a downlink signal sent by a base station, and send the downlink signal to the multiple local basic units 112.

The controller 113 is configured to generate a downlink signal phase for each remote basic unit 121 according to a down-tilt angle and/or azimuth angle of the downlink signal instructed by a control instruction.

The multiple local basic units 112 each are configured to, according to the downlink signal phase generated by the controller 113 for a corresponding remote basic unit 121, perform phase adjustment on the downlink signal sent by the base station interface unit 111, and send the downlink signal after the phase adjustment to the corresponding remote basic unit 121.

The multiple remote basic units 121 each are configured to receive the downlink signal sent by a corresponding local basic unit 112 and send the downlink signal.

The multiple remote basic units 121 each are further configured to receive an uplink signal and send the uplink signal to a corresponding local basic unit 112.

The controller 113 is configured to generate an uplink signal phase for each remote basic unit 121 according to a down-tilt angle and/or azimuth angle of the uplink signal instructed by a control instruction.

The multiple local basic units 112 each are further configured to perform, according to the uplink signal phase generated by the controller 113 for a corresponding remote basic unit 121, phase adjustment on the uplink signal sent by the corresponding remote basic unit 121, and send the uplink signal after the phase adjustment to the base station interface unit 111.

The base station interface unit 111 is further configured to send the uplink signals sent by the multiple local basic units 112 to the base station.

Here, a downlink signal phase generated by the controller 113 for each remote basic unit 121 refers to a phase of a downlink signal corresponding to each remote basic unit 121, and an uplink signal phase generated by the controller 113 for each remote basic unit 121 refers to a phase of an uplink signal corresponding to each remote basic unit 121.

The array may be arranged in multiple forms. For example, if there are six remote basic units, the six remote basic units may be arranged vertically in one column, or may be arranged horizontally in one row, or may be arranged in two rows and three columns, or may be arranged in three rows and two columns, or the like. By setting the uplink/downlink signal phase for the remote basic units in each column, a phase difference between the columns may be controlled, thereby obtaining an expected azimuth angle of the uplink/downlink signal; and by setting the uplink/downlink signal phase for the remote basic units in each row, a phase difference between the rows may be controlled, thereby obtaining an expected down-tilt angle of the uplink/downlink signal.

Specifically, position relationships of the remote basic units 121, that is, an arrangement shape of the multiple remote basic units and a position of each remote basic unit 121, is preset in the controller 113. The controller 113 may determine how to adjust the phase of the downlink signal to be sent by each remote basic unit 121 or the phase of the uplink signal received by each remote basic unit 121, according to the down-tilt angle and/or azimuth angle instructed in the control instruction, thereby obtaining the down-tilt angle and/or azimuth angle instructed in the control instruction. An administrator may send the corresponding control instruction when the down-tilt angle and/or azimuth angle of the uplink/downlink signal needs to be set or adjusted.

Further, when a wave width of the uplink/downlink signal needs to be set or adjusted, correspondingly, the control instruction may further include the wave width, such as a horizontal wave width or a vertical wave width. Correspondingly, the controller 113 may further generate a signal phase and signal amplitude for each remote basic unit according to the horizontal wave width or the vertical wave width instructed by the control instruction. Correspondingly, the multiple local basic units 112 each are configured to, according to the uplink signal phase and uplink signal amplitude of a corresponding remote basic unit 121, perform phase and amplitude adjustment on the uplink signal, or according to the downlink signal phase and downlink signal amplitude of a corresponding remote basic unit 121, perform phase and amplitude adjustment on the downlink signal. By setting the uplink/downlink signal phase and uplink/downlink signal amplitude for the remote basic units in each column, a phase difference and an amplitude difference between the columns may be controlled, thereby obtaining an expected horizontal wave width of the uplink/downlink signal; and by setting the signal phase and signal amplitude for the remote basic units in each row, a phase difference and an amplitude difference between the rows may be controlled, thereby obtaining an expected vertical wave width of the uplink/downlink signal.

In the embodiment of the present invention, by using the technical means where multiple remote basic units arranged as an array are set in a remote unit; an uplink signal phase is generated in a local unit for each remote basic unit according to a down-tilt angle and/or azimuth angle of the uplink signal instructed by a control instruction, and phase adjustment is performed on the uplink signal in each of multiple local basic units that are corresponding to the multiple remote basic units according to the uplink signal phase of a corresponding remote basic unit; or a downlink signal phase is generated for each remote basic unit according to a down-tilt angle and/or azimuth angle of the downlink signal instructed by a control instruction, and phase adjustment is performed on the downlink signal in each of the multiple local basic units that are corresponding to the multiple remote basic units according to the downlink signal phase of a corresponding remote basic unit, the uplink signal phases or downlink signal phases corresponding to the multiple remote basic units can be adjusted, and an expected down-tilt angle and/or azimuth angle of the uplink signal or the downlink signal can be obtained, thereby improving efficiency and precision for adjusting the down-tilt angle and/or azimuth angle, and overcoming the problem in the prior art that a capital expenditure is high and efficiency is low because the azimuth angle of a retransmission antenna needs to be adjusted by climbing a tower, and the efficiency and precision is low because the down-tilt angle and the azimuth angle of the retransmission antenna are mechanically adjusted.

Figure 2:
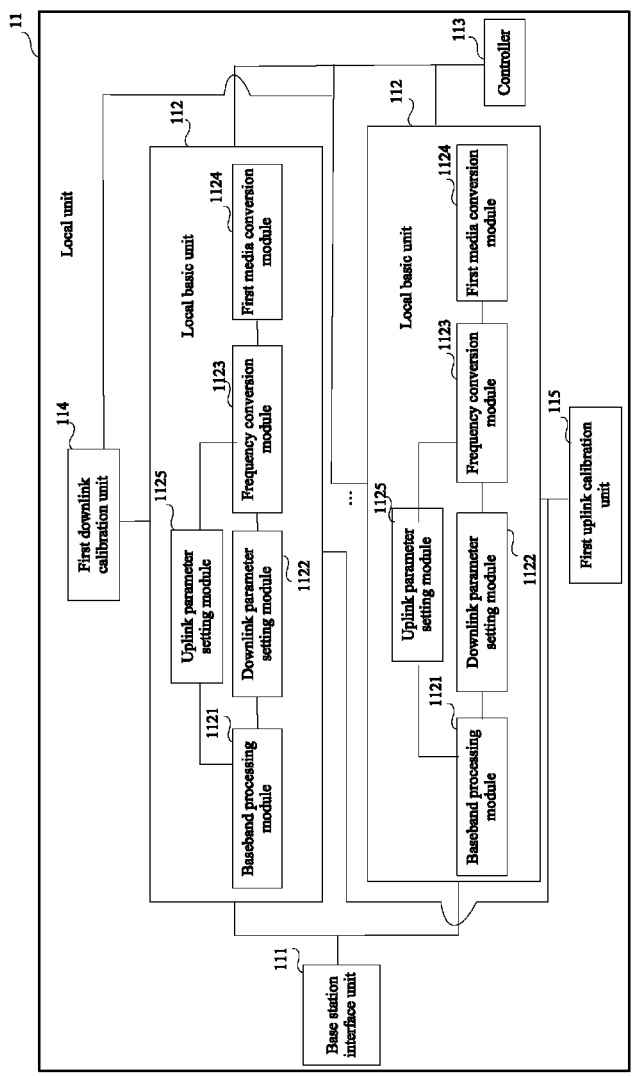
FIG. 2 is a schematic structural diagram of a local unit in a repeater according to an embodiment of the present invention.
Figure 3:
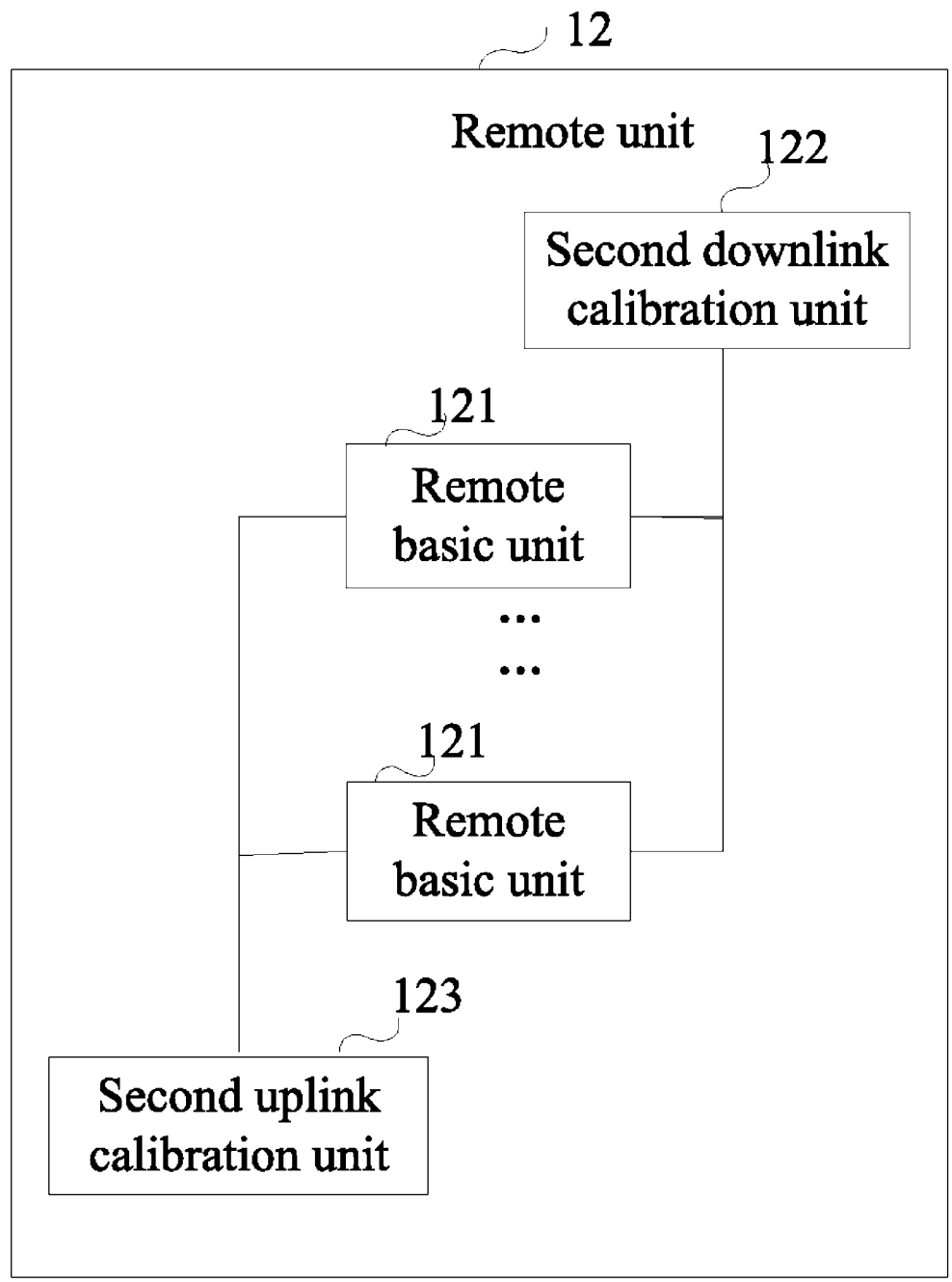
FIG. 3 is a schematic structural diagram of a remote unit in a repeater according to an embodiment of the present invention.

FIG. 2 is a schematic structural diagram of a local unit in a repeater according to an embodiment of the present invention. FIG. 3 is a schematic structural diagram of a remote unit in a repeater according to an embodiment of the present invention. Based on the embodiment shown in FIG. 1, both a local basic unit and a remote basic unit are extended, to obtain Embodiment 2. As shown in FIG. 2, each local basic unit 112 includes a baseband processing module 1121, a downlink parameter setting module 1122, a frequency conversion module 1123, and a first media conversion module 1124 cascaded in sequence.

The baseband processing module 1121 is connected to the base station interface unit 111 and is configured to perform baseband processing on a downlink signal sent by the base station interface unit 111.

The downlink parameter setting module 1122 is connected to the controller 113 and is configured to, according to a downlink signal phase generated by the controller 113 for a remote basic unit 121 corresponding to the local basic unit 112 to which the downlink parameter setting module belongs, perform phase adjustment on the downlink signal after the baseband processing.

The frequency conversion module 1123 is configured to convert the downlink signal after the phase adjustment into a radio frequency form.

The first media conversion module 1124 is configured to perform media conversion on the downlink signal in the radio frequency form, and send the signal after the media conversion to the remote basic unit 121 corresponding to the local basic unit 112 to which the first media conversion module belongs.

In an alternative embodiment of the present invention, each local basic unit 112 further includes an uplink parameter setting module 1125 connected to the baseband processing module 1121 and the frequency conversion module 1123.

The first media conversion module 1124 is further configured to receive an uplink signal sent by the remote basic unit 121 corresponding to the local basic unit 112 to which the first media conversion module belongs, and perform media conversion on the uplink signal.

The frequency conversion module 1123 is further configured to convert the uplink signal after the media conversion into a baseband form.

The uplink parameter setting module 1125 is connected to the controller 113 and is configured to, according to an uplink signal phase generated by the controller 113 for the remote basic unit 121 corresponding to the local basic unit 112 to which the uplink parameter setting module belongs, perform phase adjustment on the uplink signal in the radio frequency form.

The baseband processing module 1121 is configured to perform baseband processing on the uplink signal after the phase adjustment, and send the uplink signal after the baseband processing to the base station interface unit 111.

Further, if the repeater supports multiple carriers, to control a down-tilt angle and/or an azimuth angle of a downlink signal for each carrier, each local basic unit 112 includes multiple baseband processing modules 1121 and multiple downlink parameter setting modules 1122, where the multiple baseband processing modules 1121 are in one-to-one correspondence with the multiple carriers and the multiple downlink parameter setting modules 1122 are in one-to-one correspondence with the multiple carriers. Each local basic unit 112 further includes a first multiple-carrier module and a second multiple-carrier module, where the multiple baseband processing modules 1121 are connected to the base station interface unit 111 through the first multiple-carrier module, and the multiple downlink parameter setting modules 1122 are connected to the frequency conversion module 1123 through the second multiple-carrier module.

The controller 113 is specifically configured to generate a downlink signal phase of each carrier for each remote basic unit 121 according to a down-tilt angle and/or azimuth angle of the downlink signal of each carrier instructed by a control instruction.

The first multiple-carrier module is configured to receive the downlink signal sent by the base station interface unit 111, and perform carrier separation on the downlink signal to obtain a downlink sub-signal of each carrier.

The multiple baseband processing modules 1121 each are configured to perform baseband processing on the downlink sub-signal of a corresponding carrier, and send the downlink sub-signal of the corresponding carrier after the baseband processing to a corresponding downlink parameter setting module 1122.

The multiple downlink parameter setting module 1122 each are configured to, according to the downlink signal phase of each carrier generated by the controller 113 for the remote basic unit 121 corresponding to the local basic unit 112 to which the downlink parameter setting modules belong, perform phase adjustment on the downlink sub-signal of the corresponding carrier after the baseband processing.

The second multiple-carrier module is configured to combine downlink sub-signals of each carrier after the phase adjustment.

The frequency conversion module 1123 is specifically configured to convert the signal obtained by the combination into a radio frequency form.

The first media conversion module 1124 is specifically configured to perform media conversion on the signal in the radio frequency form, and send the signal after the media conversion to the remote basic unit 121 corresponding to the local basic unit 112 to which the first media conversion module belongs.

In another alternative embodiment of the present invention, to control a down-tilt angle and/or an azimuth angle of an uplink signal of each carrier, each local basic unit 112 further includes multiple uplink parameter setting modules 1125, where the multiple uplink parameter setting modules 1125 are in one-to-one correspondence with the multiple carriers, and the multiple uplink parameter setting modules 1125 are connected to the frequency conversion module 1123 through the second multiple-carrier module.

The controller 113 is further configured to generate an uplink signal phase of each carrier for each remote basic unit 121 according to a down-tilt angle and/or azimuth angle of the uplink signal of each carrier instructed by a control instruction.

The first media conversion module 1124 is further configured to receive an uplink signal sent by the remote basic unit 121 corresponding to the local basic unit 112 to which the first media conversion module belongs, and perform media conversion on the signal.

The frequency conversion module 1123 is further configured to convert the uplink signal after the media conversion into a baseband form.

The second multiple-carrier module is further configured to perform carrier separation on the uplink signal in the baseband form to obtain an uplink sub-signal of each carrier.

The multiple uplink parameter setting module 1125 each are configured to perform, according to an uplink signal phase of each carrier generated by the controller 113 for the remote basic unit 121 corresponding to the local basic unit 112 to which the uplink parameter setting modules belong, phase adjustment on the uplink sub-signal of a corresponding carrier, and send the uplink sub-signal of the corresponding carrier after the phase adjustment to a corresponding baseband processing module 1121.

The multiple baseband processing modules 1121 each are further configured to perform baseband processing on the uplink sub-signal of the corresponding carrier after the phase adjustment.

The first multiple-carrier module is configured to combine uplink sub-signals of each carrier after the baseband processing, and send the signal obtained by the combination to the base station interface unit 111.

To perform downlink calibration for each remote basic unit, that is, to perform calibration on a transmit channel, in another alternative embodiment of the present invention, the local unit 11 further includes a first downlink calibration unit 114 connected to the multiple local basic units 112.

As shown in FIG. 3, the remote unit 12 further includes a second downlink calibration unit 122 connected to the multiple remote basic units 121.

The first downlink calibration unit 114 is configured to generate a first calibration signal, and send the first calibration signal to the multiple remote basic units 121.

The multiple remote basic units 121 each are further configured to process the first calibration signal.

The second downlink calibration unit 122 is configured to send the first calibration signal processed by each remote basic unit 121 to the first downlink calibration unit 114.

The first downlink calibration unit 114 is further configured to, according to the generated first calibration signal and the first calibration signal that is processed by each remote basic unit 121 and is returned by the second downlink calibration unit 122, generate a downlink calibration parameter for each remote basic unit 121.

The multiple local basic units 112 each are specifically configured to, according to the downlink signal phase generated by the controller 113 for a corresponding remote basic unit 121 and the downlink calibration parameter generated by the first downlink calibration unit 114 for the corresponding remote basic unit 121, perform phase adjustment on the downlink signal.

To perform uplink calibration for each remote basic unit, that is, to perform calibration on a receive channel, in another alternative embodiment of the present invention, the local unit 11 further includes a first uplink calibration unit 115 connected to the multiple local basic units 112.

As shown in FIG. 3, the remote unit 12 further includes a second uplink calibration unit 123 connected to the multiple remote basic units 121 and the first uplink calibration unit 115.

The first uplink calibration unit 115 is configured to generate a second calibration signal, and send the second calibration signal to the second uplink calibration unit 123.

The second uplink calibration unit 123 is configured to send the second calibration signal to the multiple remote basic units 121.

The multiple remote basic units 121 each are further configured to process the second calibration signal, and send the processed second calibration signal to the first uplink calibration unit 115.

The first uplink calibration unit 115 is further configured to, according to the generated second calibration signal and the processed second calibration signal returned by each remote basic unit 121, generate an uplink calibration parameter for each remote basic unit 121.

The multiple local basic units 112 each are specifically configured to, according to the uplink signal phase generated by the controller 113 for a corresponding remote basic unit 121 and the uplink calibration parameter generated by the first uplink calibration unit 115 for the corresponding remote basic unit 121, perform phase adjustment on the uplink signal.

Specifically, each remote basic unit 121 may include a second media conversion module, an amplifier, a filter bank, a coupler, and an antenna cascaded in sequence, where the coupler is connected to the second downlink calibration unit 122 and is configured to send the first calibration signal processed by the filter bank to the second downlink calibration unit 122, and the coupler may also be connected to the second uplink calibration unit 123 and is configured to send the second calibration signal, which is sent by the second uplink calibration unit 123, to the filter bank.

In an application, a local basic unit 112 and a remote basic unit 121 that are in correspondence may be directly connected, for example, may be directly connected through an optical fiber; or multiple local basic units 112 may be converged to an interface and multiple remote basic units 121 may be converged to an interface, and the two interfaces are connected after the converging. Alternatively, the local unit 11 further includes a remote unit interface unit, and the remote unit 12 further includes a local unit interface unit, where the multiple local basic units 112 and the multiple remote basic units 121 are connected through the remote unit interface unit and the local unit interface unit.

In the embodiment, the repeater may be an optical fiber repeater. In such a scenario, the remote unit interface unit is a first wavelength division multiplexing (Wavelength Division Multiplexing, WDM) unit, the local unit interface unit is a second WDM unit, and the first media conversion module and the second media conversion module are both electric-to-optic (Electric-to-Optic, abbreviated as O/E) conversion modules. Specifically, the first WDM unit and the second WDM unit may use a coarse wavelength division multiplexing (Coarse Wavelength Division Multiplexing, abbreviated as CWDM) or dense wavelength division multiplexing (Dense Wavelength Division Multiplexing, abbreviated as DWDM) technology.

In an application, the first downlink calibration unit 114 and the first uplink calibration unit 115 may be combined into a local calibration unit; the second downlink calibration unit 122 and the second uplink calibration unit 123 may be combined into a remote calibration unit; and the first multiple-carrier module and the second multiple-carrier module each may be implemented by using a field-programmable gate array (Field-Programmable Gate Array, abbreviated as FPGA).

It should be noted that when the requirements on the down-tilt angle, azimuth angle, and wave width for an uplink signal and a downlink signal are consistent, only one control instruction may be generated, and the local basic unit and the remote basic unit both process the uplink/downlink signal according to the control instruction. For some special applications, for example, when uplink and downlink signals are imbalanced, different control instructions may be generated, so that the local unit may set different down-tilt angles, azimuth angles, and wave widths for the uplink signal and the downlink signal according to different control instructions, thereby balancing the uplink and downlink signals.

With the embodiment of the present invention, by using the technical means where multiple remote basic units arranged as an array are set in a remote unit; an uplink signal phase is generated in a local unit for each remote basic unit according to a down-tilt angle and/or azimuth angle of the uplink signal instructed by a control instruction, and phase adjustment is performed on the uplink signal in each of multiple local basic units that are corresponding to the multiple remote basic units according to the uplink signal phase of a corresponding remote basic unit; or a downlink signal phase is generated for each remote basic unit according to a down-tilt angle and/or azimuth angle of the downlink signal instructed by a control instruction, and phase adjustment is performed on the downlink signal in each of the multiple local basic units that are corresponding to the multiple remote basic units according to the downlink signal phase of a corresponding remote basic unit, the uplink signal phases or downlink signal phases corresponding to the multiple remote basic units can be adjusted, an expected down-tilt angle and/or azimuth angle of the uplink signal or downlink signal can be obtained, thereby improving efficiency and accuracy for adjusting the down-tilt angle and/or azimuth angle, overcoming the problem in the prior art that a capital expenditure is high and efficiency is low because the azimuth angle of a retransmission antenna needs to be adjusted by climbing a tower, and the efficiency and precision is low because the down-tilt angle and azimuth angle of the retransmission antenna are mechanically adjusted, and implementing dynamically adjusting a horizontal/vertical wave beam width. Multiple remote basic units send low-power downlink signals simultaneously, thereby meeting the requirement on the high power of the remote unit, reducing power consumption of the remote unit, reducing the volume and weight of the remote unit, and reducing CAPEX. Further, in this embodiment, frequency conversion is performed in the local unit, and media conversion media is performed on a radio frequency signal instead of a baseband signal and then the signal obtained after the media conversion is sent to the remote unit, which reduces the power required for the remote unit. In addition, for multiple carriers, a signal phase of each carrier of each remote basic unit may be set, thereby efficiently utilizing the capacity of the carriers.

Figure 4:
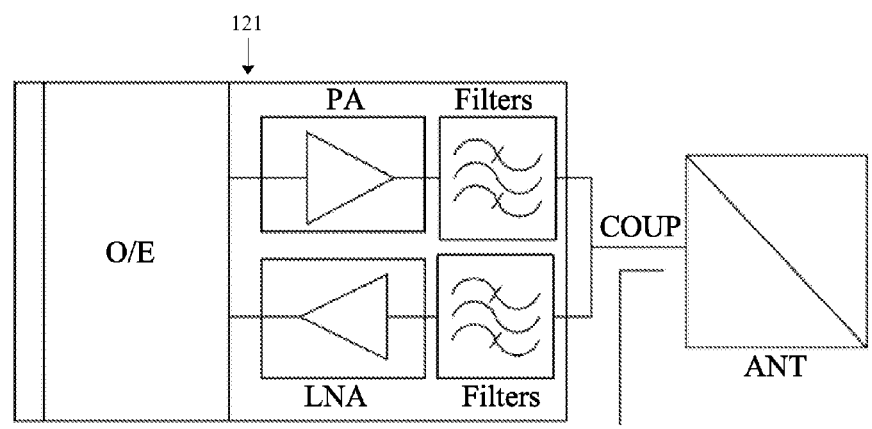
FIG. 4 is a schematic application diagram of a remote basic unit 121 in an embodiment shown in FIG. 3.

FIG. 4 is a schematic application diagram of a remote basic unit 121 in an embodiment shown in FIG. 3. As shown in FIG. 4, O/E represents an optic-electric converter, LNA represents an uplink low-noise broadband amplifier, PA represents a downlink broadband amplifier, Filters represents a filter bank, COUP represents a coupler, and ANT represents an antenna. LNA and PA both may be multiple amplifiers cascaded together, and the antenna may include at least one antenna oscillator.

For example, the output power of a filter bank in each remote basic unit is $P1$ decibel milliwatt (dBm); the gain of the antenna (a.k.a., the power gain of the antenna, or Pant), is point source antenna gain (dBi); if there are N remote basic units arranged vertically in one column, where N is a positive integer greater than 0, the value P of the effective isotropic radiated power (Effective Isotropic Radiated Power, abbreviated as EIRP) output by the antennas of the N remote basic units satisfies $P = P1 + Pant + 20 \times \log N$, where P is in dBm. Generally, assuming that $P1 = 25$ dBm and Pant$= 9$ dBi, a relationship between P and N is shown in Table 1.

TABLE 1

| N | | | | | | |
|---|---|---|---|---|---|---|
| 4 | 5 | 6 | 7 | 8 | 9 | 10 |
| P | | | | | | |
| 46 | 48 | 50 | 51 | 52 | 53 | 54 |

If there are N×M remote basic units arranged on a vertical plane and a horizontal plane, that is, arranged in N rows and M columns, where N and M both are a positive integer greater than 0, the value P of the EIRP output by antennas of the N×M remote basic units satisfies P=P1+Pant+20×log N+20×log M.

It is obvious that the output power of a single remote basic unit may be a low power, and by using multiple remote basic units arranged as an array, multiple low powers may be combined into a high power.

Figure 5:
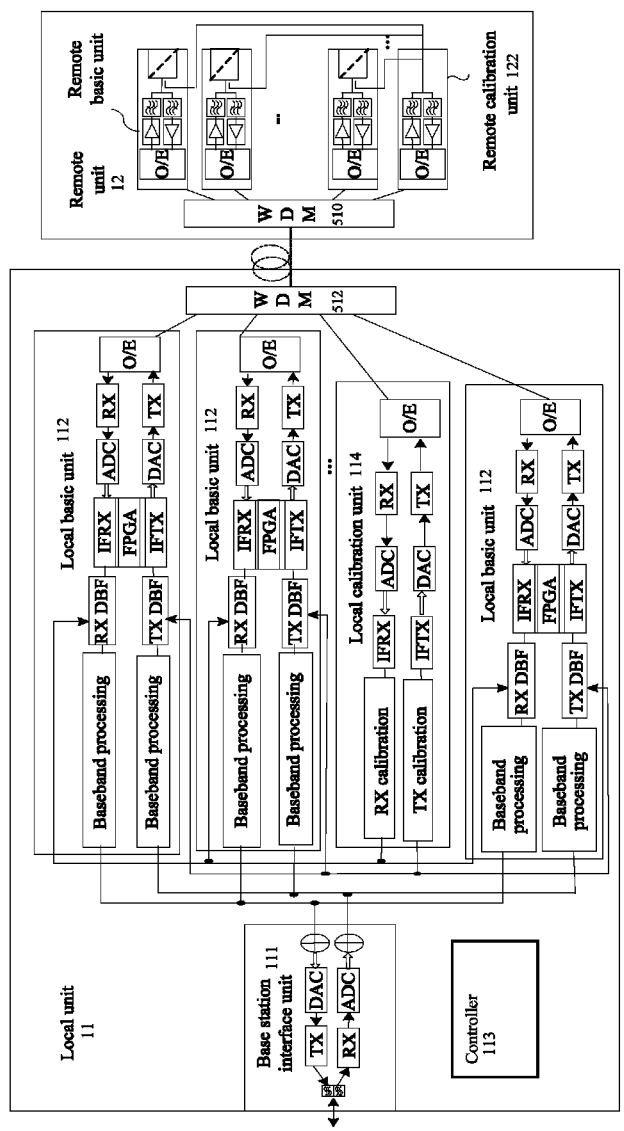
FIG. 5 is a schematic application diagram of a repeater in embodiments shown in FIG. 2 and FIG. 3.

FIG. 5 is a schematic application diagram of a repeater in embodiment shown in FIG. 2 and FIG. 3. As shown in FIG. 5, the repeater includes a local unit 11 and a remote unit 12 that are connected through an optical fiber. The local unit includes a base station interface unit 111, a local calibration unit 114, multiple local basic units 112, and a WDM (remote unit interface unit 510), and the remote unit includes a WDM (local unit interface unit 512), a remote calibration unit 122, and multiple remote basic units shown in FIG. 4. In the figure, RX represents a receive channel, TX represents a transmit channel, RX calibration represents receiving calibration, TX calibration represents transmitting calibration, RX DBF represents digital beam forming (Digital Beam Forming, abbreviated as DBF) for a received signal, TX DBF represents DBF for a transmitted signal, ADC represents analog-digital conversion, DAC represents digital-analog conversion, IFRX represents intermediate frequency processing on the received signal, IFTX represents intermediate frequency processing on the transmitted signal, FPGA represents that (IFRX/IFTX) is implemented by using a field-programmable gate array (Field-Programmable Gate Array, abbreviated as FPGA), where DAC+TX converts a downlink signal from a baseband form to a radio frequency form, and RX+ADC converts an uplink signal from a radio frequency form to a baseband form. Normally, the local unit further includes a digital signal processing (Digital Signal Processing, DSP) unit, a CPU, a source, and a clock which are not shown in the figure, where the DSP unit and the CPU cooperate to implement functions of a controller. The operating principle of the repeater shown in FIG. 5 is as follows.

Downlink direction: the local unit couples a downlink signal of a base station; down-frequency conversion is performed on the downlink signal of the base station; after intermediate frequency digitization, digital down-frequency conversion is performed; X carriers are separated in the FPGA; each carrier is divided into N×M paths by speed reduction and filtering (that is, remote basic units in N rows and M columns); DBF coefficients (N×M×X DBF coefficients in total) are set; then speed increasing, filtering, and digital up-frequency conversion are performed; the X carriers are combined; after digital-analog conversion, analog up-frequency conversion, amplification, and electric-optic conversion are performed; the signal after the conversion is output from the local unit; optic-electric conversion and amplification are completed on the remote unit; and the signal after the processing is output through an antenna oscillator.

Uplink direction: remote basic units receive N×M paths of uplink signals through antenna oscillators; after amplification, electric-optic conversion is performed; the signal after the processing is transmitted from the remote unit to the local unit; then photoelectric conversion is performed; after amplification, analog down-frequency conversion, analog-digital conversion, digital down-frequency conversion are performed to form X paths of carrier channels; speed reduction and filtering are performed; DBF coefficients are set; then the N×M paths of each carrier are combined; then speed increasing, filtering, and digital up-frequency conversion are performed; X paths of carriers are combined; digital-analog conversion is performed; then analog up-frequency conversion, amplification, and filtering are performed; and the uplink signal is output from the local unit.

Figure 6:
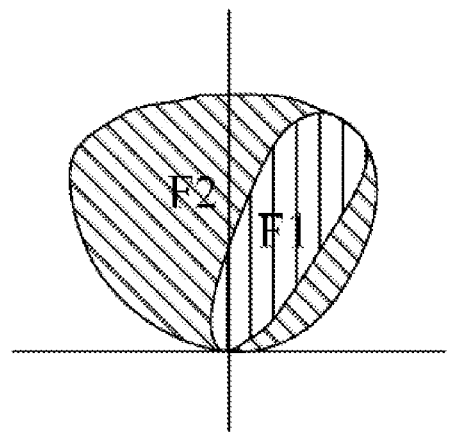
FIG. 6 is a schematic beam diagram of two carriers in an application shown in FIG. 5.
Figure 7:
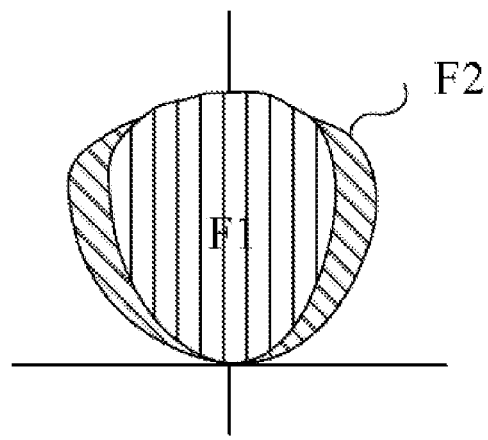
FIG. 7 is another schematic beam diagram of two carriers in an application shown in FIG. 5.
Figure 8:
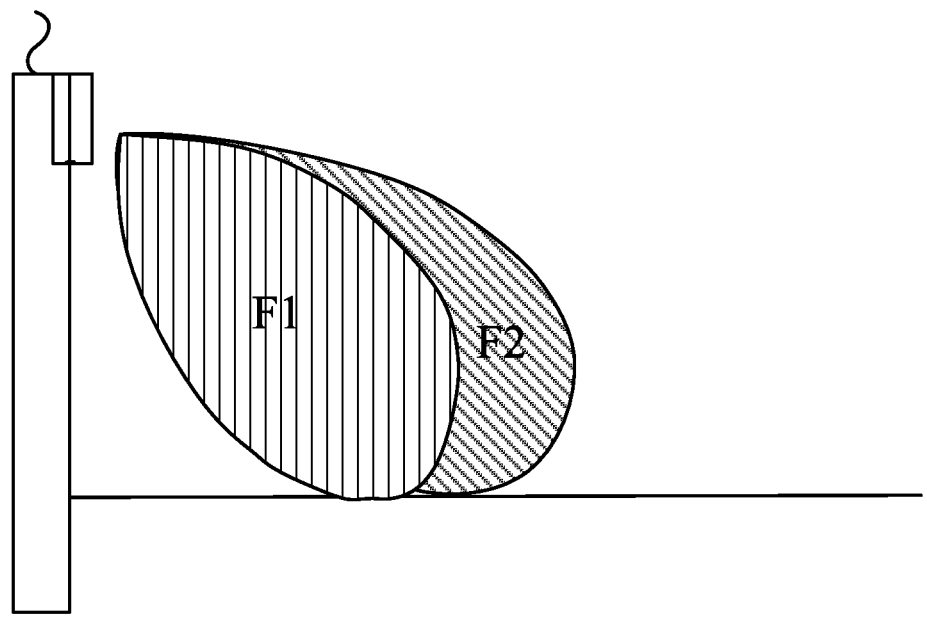
FIG. 8 is another schematic beam diagram of two carriers in an application shown in FIG. 5.

Here, the DBF coefficients include a signal phase, and may further include signal amplitude. FIG. 6 is a beam schematic diagram of two carriers in the application shown in FIG. 5. As shown in FIG. 6, when different DBF coefficients for M columns are set for two carriers F1 and F2, that is, a phase difference and an amplitude difference between the columns are controlled, different horizontal wave widths and azimuth angles may be obtained, where the carrier F1 may be used for hotspot coverage. FIG. 7 is another schematic beam diagram of two carriers in the application shown in FIG. 5. As shown in FIG. 7, when different DBF coefficients for M columns are set for two carriers F1 and F2, that is, an amplitude difference between the columns are controlled, different horizontal wave widths may be obtained, thereby facilitating cooperation and optimization with a macro network. FIG. 8 is another schematic beam diagram of two carriers in the application shown in FIG. 5. As shown in FIG. 8, when different DBF coefficients for N rows are set for two carriers F1 and F2, that is, a phase difference between the rows is controlled; different down-tilt angles may be obtained.

Because there may be two kinds of errors, namely, a non-time-varying error and a time-varying error, in an antenna array formed by antennas of the remote basic units, channel error calibration needs to be performed. The non-time-varying error includes an error caused by array element geometric position difference, mutual coupling effect between array elements, antenna radiation pattern difference, and feeder difference between array elements in array arrangement. The time-varying error refers to an error caused by inconsistent frequency responses due to an amplifier phase and gain difference which vary with the temperature of each radio frequency channel in an array, aging of devices such as a frequency mixer, a filter time delay, amplitude-frequency and phase-frequency characteristic distortion, and imbalance of a quadrature modem. In essence, channel error calibration is to track and compensate channel amplitude and phase characteristics, and reduce a relative error between channels, so as to meet the requirement on control precision of uplink and downlink beamforming algorithms.

A calibration signal for a receive channel and a calibration signal for a transmit channel both use a pseudorandom signal that is more than 20 dB lower than a channel signal. That is, a signal-to-noise ratio (Signal-to-Noise Ratio, abbreviated as SNR) is smaller than −20 dB, so that a service signal may not be affected. A service receive channel (that is, an uplink remote basic unit) and a service transmit channel (that is, a downlink remote basic unit) may be calibrated simultaneously.

For a transmit calibration channel (that is, a second downlink calibration unit), first, a value of a transmit calibration signal is calculated by using a received signal strength indication (Received Signal Strength Indication, abbreviated as RSSI) of each service receive channel; then, according to a principle that a calibration signal reaching the service receive channel needs to be 20 dB lower than a service signal, a power of transmitting a pseudorandom sequence signal is calculated and then the signal is transmitted, demodulation is performed through the service receive channel, and by using correlation accumulation for a long period of time, characteristic extraction for the service receive channel and calibration are completed.

For a receive calibration channel (that is, a second uplink calibration unit), because each service transmit channel transmits pseudorandom signals having consistent amplitude and the power of transmitting the pseudorandom signals is 20 dB lower than a minimum output power in the service transmit channel, which are transmitted together with a service signal and then received and demodulated by using the receive calibration channel, correlation accumulation for a long period of time is used to complete characteristic extraction for the service transmit channel and calibration.

In the embodiment of the present invention, the implementation manner of the remote unit may include, but not limited to, the following.

If a remote basic unit includes one polarized antenna oscillator, in such a scenario, one transport receive X (TRX) may be used to drive the antenna oscillator. It is unnecessary to use a receive/transmit diversity technology. That is, a single-polarized antenna is used. N×M remote basic units may be set in N rows and M columns, where N may be an integer greater than or equal to 4, and M may be an integer greater than or equal to 1.

If a remote basic unit includes two similarly polarized antenna oscillators, in such a scenario, one TRX may be used to drive the two antenna oscillators. It is unnecessary to use a receive/transmit diversity technology. That is, a single-polarized antenna is used. N×M/2 remote basic units may be set in N/2 rows and M columns, where N may be an even number greater than or equal to 4, and M may be an integer greater than or equal to 1.

That is, on the basis that the effect for adjusting a down-tilt angle and an azimuth angle is not affected, when one remote basic unit includes two similarly polarized antenna oscillators, the remote unit may include fewer remote basic units, and a cost is lower.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make replacements to some technical features thereof, and such modifications or replacements cannot make the essence of the corresponding technical solutions depart from the idea and scope of the technical solutions of the embodiments of the present invention.

What is claimed is:

1. A repeater, comprising:
a local unit that comprises a base station interface unit, multiple local basic units connected to the base station interface unit, and a controller connected to the multiple local basic units; and
a remote unit that comprises multiple remote basic units, wherein the multiple remote basic units are arranged as an array and the multiple remote basic units are in one-to-one correspondence with the multiple local basic units;
wherein the base station interface unit is configured to receive a downlink signal sent by a base station and to send the downlink signal to the multiple local basic units;
wherein the controller is configured to generate a downlink signal phase for each remote basic unit according to a down-tilt angle and/or azimuth angle of the downlink signal instructed by a control instruction;
wherein the multiple local basic units each are configured to perform, according to the downlink signal phase generated by the controller for a corresponding remote basic unit, phase adjustment on the downlink signal sent by the base station interface unit, and to send the downlink signal after the phase adjustment to the corresponding remote basic unit;
wherein the multiple remote basic units each are configured to receive the downlink signal sent by a corresponding local basic unit and to send the downlink signal;
wherein the multiple remote basic units each are further configured to receive an uplink signal and to send the uplink signal to a corresponding local basic unit;
wherein the controller is configured to generate an uplink signal phase for each remote basic unit according to a down-tilt angle and/or azimuth angle of the uplink signal instructed by a control instruction;
wherein the multiple local basic units each are further configured to perform, according to an uplink signal phase generated by the controller for a corresponding remote basic unit, phase adjustment on an uplink signal sent by the corresponding remote basic unit, and to send the uplink signal after the phase adjustment to the base station interface unit; and
wherein the base station interface unit is further configured to send uplink signals, which are sent by the multiple local basic units to the base station.

2. The repeater according to claim 1, wherein each of the multiple local basic units comprises a baseband processing module, a downlink parameter setting module, a frequency conversion module, and a first media conversion module cascaded in sequence;
wherein the baseband processing module is connected to the base station interface unit and is configured to perform baseband processing on the downlink signal sent by the base station interface unit;
wherein the downlink parameter setting module is connected to the controller and is configured to perform, according to the downlink signal phase generated by the controller for a remote basic unit corresponding to a local basic unit to which the downlink parameter setting module belongs, phase adjustment on the downlink signal after the baseband processing;
wherein the frequency conversion module is configured to convert the downlink signal after the phase adjustment into a radio frequency form; and
wherein the first media conversion module is configured to perform media conversion on the downlink signal in the radio frequency form, and to send a signal after the media conversion to the remote basic unit corresponding to the local basic unit to which the first media conversion module belongs.

3. The repeater according to claim 2, wherein each of the local basic units further comprises an uplink parameter setting module that is connected to the baseband processing module and the frequency conversion module;
wherein the first media conversion module is further configured to receive an uplink signal sent by the remote basic unit corresponding to the local basic unit to which the first media conversion module belongs, and to perform media conversion on the uplink signal;

the frequency conversion module is further configured to convert the uplink signal after the media conversion into a baseband form;

wherein the uplink parameter setting module is connected to the controller and is configured to, according to the uplink signal phase generated by the controller for the remote basic unit corresponding to the local basic unit to which the uplink parameter setting module belongs, perform phase adjustment on the uplink signal in the baseband form; and wherein the baseband processing module is configured to perform baseband processing on the uplink signal after the phase adjustment and to send the uplink signal after the baseband processing to the base station interface unit.

4. The repeater according to claim 2, wherein the repeater supports multiple carriers;

wherein each of the multiple local basic units comprise multiple baseband processing modules and multiple downlink parameter setting modules;

wherein the multiple baseband processing modules are in one-to-one correspondence with the multiple carriers and the multiple downlink parameter setting modules are in one-to-one correspondence with the multiple carriers;

wherein each of the multiple local basic units further comprises a first multiple-carrier module and a second multiple-carrier module;

wherein the multiple baseband processing modules are connected to the base station interface unit through the first multiple-carrier module; and wherein the multiple downlink parameter setting modules are connected to the frequency conversion module through the second multiple-carrier module;

wherein the controller is specifically configured to generate the downlink signal phase of each carrier for each remote basic unit according to the down-tilt angle and/or azimuth angle of the downlink signal of each carrier instructed by a control instruction;

wherein the first multiple-carrier module is configured to receive the downlink signal sent by the base station interface unit, and to perform carrier separation on the downlink signal to obtain a downlink sub-signal of each carrier;

wherein the multiple baseband processing modules each are configured to perform baseband processing on a downlink sub-signal of a corresponding carrier, and to send the downlink sub-signal of the corresponding carrier after the baseband processing to a corresponding downlink parameter setting module;

wherein the multiple downlink parameter setting modules each are configured to, according to the downlink signal phase of each carrier generated by the controller for the remote basic unit corresponding to the local basic unit to which the downlink parameter setting modules belong, perform phase adjustment on the downlink sub-signal of the corresponding carrier after the baseband processing;

wherein the second multiple-carrier module is configured to combine downlink sub-signals of each carrier after the phase adjustment;

wherein the frequency conversion module is specifically configured to convert a signal obtained by the combination into a radio frequency form; and wherein the first media conversion module is specifically configured to perform media conversion on the signal in the radio frequency form, and send a signal after the media conversion to the remote basic unit corresponding to the local basic unit.

5. The repeater according to claim 4, wherein each of the multiple local basic units further comprises multiple uplink parameter setting modules;

wherein the multiple uplink parameter setting modules are in one-to-one correspondence with the multiple carriers; and the multiple uplink parameter setting modules are connected to the frequency conversion module through the second multiple-carrier module;

wherein the controller is further configured to generate an uplink signal phase of each carrier for each remote basic unit according to the down-tilt angle and/or azimuth angle of the uplink signal of each carrier instructed by a control instruction;

wherein the first media conversion module is further configured to receive an uplink signal sent by the remote basic unit corresponding to the local basic unit to which the first media conversion module belongs, and perform media conversion on the uplink signal;

wherein the frequency conversion module is further configured to convert the uplink signal after the media conversion into a baseband form;

wherein the second multiple-carrier module is further configured to perform carrier separation on the uplink signal in the baseband form to obtain an uplink sub-signal of each carrier;

wherein the multiple uplink parameter setting modules each are configured to perform, according to the uplink signal phase of each carrier generated by the controller for the remote basic unit corresponding to the local basic unit to which the uplink parameter setting modules belong, phase adjustment on an uplink sub-signal of a corresponding carrier, and send the uplink sub-signal of the corresponding carrier after the phase adjustment to a corresponding baseband processing module;

wherein the multiple baseband processing modules each are further configured to perform baseband processing on the uplink sub-signal of the corresponding carrier after the phase adjustment; and wherein the first multiple-carrier module is configured to combine uplink sub-signals of each carrier after the baseband processing, and send a signal obtained by the combination to the base station interface unit.

6. The repeater according to claim 1, wherein the local unit further comprises a first downlink calibration unit connected to the multiple local basic units;

wherein the remote unit further comprises a second downlink calibration unit connected to the multiple remote basic units and the first downlink calibration unit;

wherein the first downlink calibration unit is configured to generate a first calibration signal and to send the first calibration signal to the multiple remote basic units;

wherein the multiple remote basic units each are further configured to process the first calibration signal;

wherein the second downlink calibration unit is configured to send the first calibration signal processed by each remote basic unit to the first downlink calibration unit;

wherein the first downlink calibration unit is further configured to, according to the generated first calibration signal and the first calibration signal that is processed by each remote basic unit and is returned by the second calibration unit, generate a downlink calibration parameter for each remote basic unit; and wherein the multiple local basic units each are specifically configured to, according to the downlink signal phase generated by the controller for a corresponding remote basic unit and a downlink calibration parameter generated by the first downlink calibration unit for the corresponding remote basic unit, perform phase adjustment on the downlink signal.

7. The repeater according to claim 6, wherein the local unit further comprises a first uplink calibration unit connected to the multiple local basic units;

wherein the remote unit further comprises a second uplink calibration unit connected to the multiple remote basic units and the first uplink calibration unit;

wherein the first uplink calibration unit is configured to generate a second calibration signal, and send the second calibration signal to the second uplink calibration unit;

wherein the second uplink calibration unit is configured to send the second calibration signal to the multiple remote basic units;

wherein the multiple remote basic units each are further configured to process the second calibration signal and to send the processed second calibration signal to the first uplink calibration unit;

wherein the first uplink calibration unit is further configured to, according to the generated second calibration signal and the processed second calibration signal returned by each remote basic unit, generate an uplink calibration parameter for each remote basic unit; and wherein the multiple local basic units each are specifically configured to, according to the uplink signal phase generated by the controller for a corresponding remote basic unit and an uplink calibration parameter generated by the first uplink calibration unit for the corresponding remote basic unit, perform phase adjustment on the uplink signal.

8. The repeater according to claim 7, wherein each of the multiple remote basic units comprises a second media conversion module, an amplifier, a filter bank, a coupler, and an antenna cascaded in sequence, wherein the coupler is connected to the second downlink calibration unit and the second uplink calibration unit.

9. The repeater according to claim 1, wherein the local unit further comprises a remote unit interface unit and the remote unit further comprises a local unit interface unit, wherein the multiple local basic units and the multiple remote basic units are connected through the remote unit interface unit and the local unit interface unit.

10. The repeater according to claim 9, wherein the repeater is an optical fiber repeater.

11. The repeater according to claim 10, wherein the remote unit interface unit is a first wavelength-division multiplexing WDM unit, the local unit interface unit is a second WDM unit, and the first media conversion module and the second media conversion module are both photoelectric conversion modules.

* * * * *